United States Patent
Leko et al.

(10) Patent No.: US 9,262,511 B2
(45) Date of Patent: Feb. 16, 2016

(54) SYSTEM AND METHOD FOR INDEXING STREAMS CONTAINING UNSTRUCTURED TEXT DATA

(71) Applicant: Red Lambda, Inc., Longwood, FL (US)

(72) Inventors: Adam Leko, Longwood, FL (US); Robert Bird, Longwood, FL (US); Matthew Whitlock, Longwood, FL (US)

(73) Assignee: Red Lambda, Inc., Longwood, FL (US)

( * ) Notice: Subject to any disclaimer, the term of this patent is extended or adjusted under 35 U.S.C. 154(b) by 13 days.

(21) Appl. No.: 13/832,767

(22) Filed: Mar. 15, 2013

(65) Prior Publication Data

US 2014/0032568 A1    Jan. 30, 2014

Related U.S. Application Data

(60) Provisional application No. 61/677,171, filed on Jul. 30, 2012.

(51) Int. Cl.
*G06F 17/30* (2006.01)

(52) U.S. Cl.
CPC .... *G06F 17/30625* (2013.01); *G06F 17/30516* (2013.01)

(58) Field of Classification Search
CPC ............ G06F 17/30625; G06F 17/30516; G06F 17/30; G06F 21/79; G06F 21/86; G06F 2221/2129; G06F 17/211; G06F 17/241; G06F 17/243; G06F 17/30011; G06F 17/30047; G06F 17/30864; G06F 17/30873; G06F 17/30094; G06F 17/30563; G06K 9/00442; H04N 1/00307; H04N 1/00355; H04N 1/00
USPC ......... 707/743, 741, 723, 736, 706, 707, 711, 707/693, 649, 636, 752, E17.005, E17.002, 707/E17.014, E17.01, E17.032; 715/246, 715/205, 234; 709/224, 241, 233; 704/251, 704/E15.003

See application file for complete search history.

(56) References Cited

U.S. PATENT DOCUMENTS 5,668,897 A * 9/1997 Stolfo .................. 707/E17.023
5,809,078 A * 9/1998 Tani et al. .................... 375/259

(Continued)

OTHER PUBLICATIONS

Dou Shen et al.—"Thread detection in dynamic text message streams"—Published in: Proceeding SIGIR '06 Proceedings of the 29th annual international ACM SIGIR conference on Research and development in information retrieval—Aug. 6-11, 2006, Seattle, Washington USA—pp. 35-42.*

(Continued)

*Primary Examiner* — Anh Ly
(74) *Attorney, Agent, or Firm* — William G. Giltinan; Carlton Fields Jorden Burt, PA (57) ABSTRACT

A system, method and computer readable medium for indexing streaming data. Data may be received from distributed devices connected via a network. Data elements may be stored and allocated to data blocks and events of the block stores. Non-text data may be converted into a text representation. The data may be split into terms, and term frequencies of each term within each of the event may be calculated. Block-level term frequency statics may be calculated based on the term frequencies. Tree index structures, such as the Y-tree index, may be generated based on the block-level term frequency data. The Y-tree index structures may use the terms as keys and pointers to the corresponding data blocks and block-level term frequency data. A search query may be performed over the tree index structures.

29 Claims, 3 Drawing Sheets

(56) References Cited

U.S. PATENT DOCUMENTS

| | | | | |
|---|---|---|---|---|
| 6,072,830 | A * | 6/2000 | Proctor et al. | 375/240.22 |
| 6,100,906 | A * | 8/2000 | Asaro et al. | 345/539 |
| 6,122,640 | A * | 9/2000 | Pereira | 707/648 |
| 6,349,310 | B1 * | 2/2002 | Klein et al. | 707/703 |
| 6,623,529 | B1 * | 9/2003 | Lakritz | 715/205 |
| 7,117,341 | B2 | 10/2006 | Khu | |
| 7,346,220 | B2 * | 3/2008 | Jeffrey et al. | 382/248 |
| 7,443,321 | B1 | 10/2008 | Kaufman et al. | |
| 7,539,867 | B2 | 5/2009 | Bolosky et al. | |
| 8,078,655 | B2 * | 12/2011 | Grubov et al. | 707/610 |
| 8,370,732 | B2 | 2/2013 | Black et al. | |
| 8,473,778 | B2 | 6/2013 | Simitci et al. | |
| 8,601,149 | B2 * | 12/2013 | Ando | G11B 20/00086 709/231 |
| 2002/0036856 | A1 * | 3/2002 | Korst et al. | 360/55 |
| 2002/0083183 | A1 * | 6/2002 | Pujare et al. | 709/224 |
| 2003/0135495 | A1 * | 7/2003 | Vagnozzi | 707/3 |
| 2004/0111677 | A1 * | 6/2004 | Luken et al. | 715/523 |
| 2004/0167906 | A1 * | 8/2004 | Smith et al. | 707/100 |
| 2004/0243557 | A1 * | 12/2004 | Broder et al. | 707/3 |
| 2005/0278378 | A1 * | 12/2005 | Frank | 707/104.1 |
| 2005/0289168 | A1 * | 12/2005 | Green et al. | 707/101 |
| 2006/0101045 | A1 * | 5/2006 | Chen et al. | 707/101 |
| 2006/0206860 | A1 * | 9/2006 | Dardinski et al. | 717/105 |
| 2006/0265649 | A1 * | 11/2006 | Danilo | 715/542 |
| 2007/0073894 | A1 * | 3/2007 | Erickson et al. | 709/230 |
| 2007/0214133 | A1 * | 9/2007 | Liberty et al. | 707/5 |
| 2007/0240061 | A1 * | 10/2007 | Cormode et al. | 715/736 |
| 2008/0095071 | A1 | 4/2008 | Lu et al. | |
| 2008/0098301 | A1 | 4/2008 | Black et al. | |
| 2008/0189429 | A1 | 8/2008 | DaCosta | |
| 2008/0263032 | A1 * | 10/2008 | Vailaya et al. | 707/6 |
| 2008/0294674 | A1 * | 11/2008 | Reztlaff et al. | 707/102 |
| 2009/0226872 | A1 * | 9/2009 | Gunther | 434/350 |
| 2009/0265171 | A1 * | 10/2009 | Davis | 704/251 |
| 2010/0030809 | A1 * | 2/2010 | Nath | 707/104.1 |
| 2010/0094870 | A1 * | 4/2010 | Narang et al. | 707/736 |
| 2010/0106695 | A1 * | 4/2010 | Calder et al. | 707/696 |
| 2010/0250497 | A1 * | 9/2010 | Redlich et al. | 707/E17.005 |
| 2011/0035656 | A1 * | 2/2011 | King et al. | 715/234 |
| 2011/0282880 | A1 | 11/2011 | Baarman et al. | |
| 2012/0060072 | A1 | 3/2012 | Simitci et al. | |
| 2013/0124476 | A1 * | 5/2013 | Zhong et al. | 707/636 |
| 2013/0124751 | A1 * | 5/2013 | Ando | G11B 27/105 709/233 |
| 2013/0246334 | A1 * | 9/2013 | Ahuja et al. | 707/600 |

OTHER PUBLICATIONS

Andrew Lampert et al.—"Segmenting email message text into zones" Published in: Proceeding EMNLP '09 Proceedings of the 2009 Conference on Empirical Methods in Natural Language Processing: vol. 2—vol. 2—Singapore, Aug. 6-7, 2009—pp. 919-928.*

Manning, Christopher, Introduction to Information Retrieval, Jul. 7, 2008, Cambridge University Press, New York.

Jermaine, Chris, et all., "A Novel Index Supporting High Volume Data Warehouse Insertion", VLDB '99 Proceedings of the 25th International Conference on Very Large Data Bases, 1999, pp. 235-246, Morgan Kaufmann Publishers Inc., San Francisco, CA.

Persin, Michael, et al., "Filtered document retrieval with frequency-sorted indexes", Journal of the American Society for Information Science, Oct. 1996, pp. 749-764, vol. 47, Issue 10, John Wiley & Sons, New York.

Davis, Mark, "Unicode Standard Annex #29", http://www.unicode.org/reports/tr29/.

Zhou, Wenchao et al., "Efficient Querying and Maintence of Network Provences at Internet Scale," Sigmody 1, Jun. 6-11, 2010, Indianoplis, IN Jun. 6, 2010.

Manning, Christopher, Introduction to Information Retrieval, Jul. 2008, Cambridge University Press, New York Jul. 7, 2008.

"Apache Lucene Core", http://lucene.apache.org/core Dec. 31, 1900.

Jermaine, Chris, et al. "A Novel Index Supporting High Volume Data Warehouse Insertion", VLDB'99 Proceedings of the 25th International Conference on Very Large Data Bases, 1999, pp. 235-245, Morgan Kaufman Publishers Inc., San Francisco, CA Dec. 31, 1999.

Persin, Michael et al. "Filtered Document retrieval with fequency-sorted indexes", Journal of hte American Society for Information Science, Oct. 1996, pp. 749-764, vol. 47, Issue 10, John Wiley & Sons, New York, Oct. 31, 1996.

Davis, Mark. "Unicode Standard Annex #29", http://www.unicode.org/reports/tr29, Dec. 31, 1900.

Hossain, Sohrab et al. "A Critical Comparison Between Distributed Database Approach and Data Warehousing Approach", ISJER (www.ijser.org) Jan. 2014.

Change, Fay et al. "Bigtable: A Distriuted Storage System for Structured Data", Google., http://static.googleusercontent.com/media/research.google.com/en/us/archive/bigtable-osdi06.pdf Aug. 30, 2006.

"HBase vs. BigTable Comparison" http://www.larsgeorge.com/2009/11/hbase-vs-bigtable-comparison.html Nov. 24, 2009.

Lakshman, Avinash et al., "Cassandra—A Decentralized Structured Storage System", http://www.cs.cornell.edu/projects/ladis2009/papers/lakshman-ladis2009.pdf Dec. 2009.

Lamport, Leslie, "Paxos Made Simple", http://research.microsoft.com/en-us/um/people/lamport/pubs/paxos-simple.pdf Nov. 2001.

"Big Table" http://en.wikipedia.org/wiki/BigTable Jul. 16, 2012.

"Distributed database" http://en.wikipedia.org/wiki/Distributed_database Jul. 16, 2012.

"Druid (open-source data store)", http://en.wikipedia.org/wiki/Druid_%28open-source_data_store%29 Feb. 6, 2014.

"Comparison Between centralized and distributed DBMS", http://www.ukessays.co.uk/essays/information-technology/comparison-between-centralized-and-distributed-dbms.php Jan. 1, 1901.

"Distributed database" http://en.wikipedia.org/wiki/distributed_database Jan. 1, 1901.

"Big Table" http://en.wikipedia.org/wiki/bigTable Jan. 1, 1901.

Ellis, Jonathan, "Facebook's Cassandra paper, annotated and compared to Apache Cassandra 2.0", http://docs.datastax.com/en/articles/cassandra/cassandrathenandnow.html Jan. 1, 1901.

Yang, Fanglin, et al. "Druid: a Real-time Analytical Data Store" Jan. 1, 1901.

"Druid (open source data store)", http://en.wikipedia.org/wiki/Druid_%28open-source_data_store%29 Jan. 1, 1901.

* cited by examiner

FIGURE 1: Processing time
X-Axis: gigabytes of input, Y-Axis: time to process in minutes

FIGURE 2: Space overhead
X-Axis: gigabytes of input, Y-Axis: size on disk in gigabytes

ABSTRACT removed — this is the first page of a patent.

SYSTEM AND METHOD FOR INDEXING STREAMS CONTAINING UNSTRUCTURED TEXT DATA

This non-provisional patent application claims priority to, and incorporates herein by reference, U.S. Provisional Patent Application No. 61/677,171 which was filed Jul. 30, 2012 and further incorporates herein by reference, U.S. patent application Ser. No. 13/600,853 which was filed Aug. 31, 2012.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The presently disclosed invention relate in general to the field of indexing and retrieving data, and in particular to a system and method for indexing streaming text data in distributed systems.

BACKGROUND OF THE INVENTION

Systems for indexing text data are known in the art. Basic data indexing and information retrieval techniques have been described in a book entitled "Introduction to Information Retrieval", ISBN 0521865719. Technology for applications that require full-text searches is well known in the Apache community for the Apache Lucene Core open-source software project, which is supported over the Internet by the Apache Software Foundation. In addition, the paper entitled "A Novel Index Supporting High Volume Data Warehouse Insertions" which is authored by C. Jermaine et al., while failing to address text indexing, describes certain indexing techniques and Y-tree index structures for processing fast insertions of telephone Call Detail Records (CDR). All of these publications are incorporated herein by reference. Such indexing systems, however, are problematic for full-text indexing on large volumes of streaming data. The presently disclosed invention addresses such limitations, inter alias, by providing an improved text indexing system and method with acceptable worst-case insertion performance to enable real-time querying of streams of data.

SUMMARY OF THE INVENTION

The presently disclosed invention may be embodied in various forms, including a system, computer readable medium or a method for indexing data.

In an embodiment of a data indexing system, the system may comprise block-stores adapted to store data-elements of data-streams. The system may comprise one or more data-blocks of the block-stores. The stored data-elements may be allocated to the one or more data-blocks. In addition, the system may comprise events of the one or more data-blocks. The block-allocated data-elements may be further allocated to the events of the data-blocks. Each of the data-blocks may comprise one or more events. Each of the events may comprise the block-allocated data-elements of a corresponding data-block.

The system may further comprise terms generated by splitting the event-allocated data-elements, and term frequencies calculated based on the frequency of each term in each of the event. The system may also comprise block-level term frequency data calculated for the event-allocated data-elements that are stored in a corresponding data-block. The block-level term frequency data may be based on the term frequencies. Further, the system may comprise tree index structures generated for the event-allocated data-elements based on the block-level term frequency data. The tree index structures may comprise Y-tree index structures. The terms may be used in the Y-tree index structures as keys. In an embodiment, the block-stores may be stored on a plurality of distributed devices. In certain embodiments, the data-streams may be received from a plurality of distributed devices. The plurality of distributed devices may be connected via a network.

Further disclosed is an embodiment of a computer readable medium for the presently disclosed invention comprising computer readable instructions stored thereon for execution by a processor. The instructions on the computer-usable medium may be adapted to enable a computing device to receive data-streams, wherein the data-streams may comprise data-elements, and store the data-elements of the received data-streams, wherein the stored data-elements may be stored in block-stores. In addition, the instructions may enable a computing device to allocate the stored data-elements to data-blocks of the block-stores and further allocate the block-allocated data-elements to events of the data-blocks. Each of the data-blocks may comprise one or more events. Each of the events may comprise the block-allocated data-elements of the corresponding data-block. Further, the instructions may enable a computing device to split the event-allocated data-elements into terms, calculate a frequency of each term in each of the event, and calculate block-level term frequency data for the event-allocated data-elements stored in the corresponding data-block based on the calculated term frequencies. The instructions may also enable a computing device to generate tree index structures for the event-allocated data-elements based on the block-level term frequency data. The tree index structures may comprise Y-tree index structures. The terms may be used in the Y-tree index structures as keys.

Similarly, an embodiment of a method for the presently disclosed invention may include the step of receiving data-streams. The data-streams may be received from a single distributed device or from a plurality of distributed devices. The distributed devices may be connected via a network. Each of the data-streams may comprise data-elements. The method may include the step of storing the data-elements of the received data-streams. The stored data-elements may be stored in block-stores. The block-stores may be stored on a single distributed device or across a plurality of distributed devices. Such distributed devices may be connected via a network.

Further, the method may include the step of allocating the stored data-elements to data-blocks of the block-stores. Each of the block-stores may comprise one or more data-blocks. In an embodiment, each data-block may comprise the stored data-elements of only one of the received data-streams. The data-blocks of a single data-stream may be logically grouped together. Each of the data-blocks may be read and written as a single unit. In addition, the method may include allocating the block-allocated data-elements to events of the data-blocks. Each of the data-blocks may comprise one or more events. Each of the events may comprise the block-allocated data-elements of the corresponding data-block.

In addition, the method may include the step of splitting the event-allocated data-elements into terms. Further, the method may include the step of calculating a frequency of each term within each of the event, and the step of calculating block-level term frequency statics or data for the event-allocated data-elements that are stored in the corresponding data-block based on the calculated term frequencies. The method may also include the step of generating tree index structures for the event-allocated data-elements based on the block-level term frequency data. The tree index structures may comprise Y-tree index structures. The Y-tree index structures may use the terms as keys.

In embodiments of the above-disclosed system, computer readable medium, and method, pointers to the data-blocks may be generated. Such pointers may comprise values stored in the Y-tree index structures that identify, or point to, the corresponding data-blocks and the corresponding block-level term frequency data.

In some embodiments of the above-disclosed system, computer readable medium, and method, event-allocated data-elements may comprise text data. Event-allocated data-elements may also comprise a text representation of non-text data, as data-streams may comprise non-text data that is converted into a text representation. Event-allocated data-elements may comprise unstructured data, which may be split in accordance with processes outlined in an Unicode Standard Annex #29 published the Unicode Consortium. Multiple writers to the data-blocks may have an independent tree structure.

In certain embodiments of the above-disclosed system, computer readable medium, and method, a search query of the tree index structures may be performed. The search query for the data-elements may be performed over all of the tree index structures. Term statistics may be extracted from query text of the search query. In some embodiments, a list of candidate data-blocks may be generated that satisfy the search query based on the Y-tree index structure. The search query may be evaluated against each of the data-blocks to generate a list of matching records.

In some embodiments of the above-disclosed system, computer readable medium, and method, a term-proximity search query of the tree index structures may be performed. In an embodiment, the term-proximity search query may be a wild-card suffix matches search query, wherein a minimum key in the Y-tree index structures satisfies a pattern requirement. The keys may be iterated through until a key is reached that is different from the pattern requirement. In certain embodiments, the term-proximity search query may be a fuzzy matches search. In an embodiment, the term-proximity search query may be based on a Soundex algorithm. In some embodiments, a list of the terms that are present in a master Y-tree index structure may be maintained.

In an embodiment of the above-disclosed system, computer readable medium, and method, individual pages within the Y-tree index structure may be compressed. The individual pages within the Y-tree index may be compressed utilizing compression algorithms. The individual pages within the Y-tree index may be compressed by storing data-block in the Y-tree index structures via gap-compressed encodings, such as $\gamma$ or $\delta$ gap-compressed encodings.

In an embodiment of the above-disclosed system, computer readable medium, and method, search queries may be multicasted to a set of dedicated search nodes that perform searches. Search queries may be transmitted to a group of destination computing devices simultaneously in a single transmission from the requesting computing device, which may have minimal resources. In some embodiments, query results that are gathered from the search nodes may be combined. Separate Y-tree index structures may be utilized per stream writers. In certain embodiments, an index data page cache for the search nodes may be generated. In an embodiment, a pre-determined amount of time that an index data page may reside in the cache before being refreshed with a new page from the backing storage may be adjusted.

In an embodiment of the above-disclosed system, computer readable medium, and method, a block-identifier may be assigned to each of the data-blocks. Such a block-identifier may be globally unique. Each of the block-stores may comprise one or more data-blocks. Each of the data-blocks may be read and written as a single unit. The data-blocks of a single data-stream may be logically grouped.

BRIEF DESCRIPTION OF THE DRAWINGS

The foregoing and other objects, features, and advantages of the invention will be apparent from the following more particular description of embodiments as illustrated in the accompanying drawings, in which reference characters refer to the same parts throughout the various views. The drawings are not necessarily to scale, emphasis instead being placed upon illustrating principles of the invention.

DETAILED DESCRIPTION OF THE EMBODIMENTS

Reference will now be made in detail to the embodiments of the presently disclosed invention, examples of which are illustrated in the accompanying drawings.

One of the objects of the present system and method may be an application in which full-text indexing on large volumes of streaming data 1 is performed with acceptable worst-case insertion. The object for certain embodiments may concern such an application which enables real-time querying of data 2 streaming over a network 3. Such data-elements 2 of streaming data 1 may be received and stored in block-stores 4. These block-stores 4 may be stored on a distributed device 5 or across a plurality of distributed devices 5. The block-stores 4 may comprise data-blocks 6, which may be assigned with block-identifiers 7. The data-blocks 6 may comprise events 8. The block-allocated data-elements 5 may be further allocated to the events 8 of the data-blocks 6. Embodiments may not be limited, however, to any one application, example or object. The embodiments may be applicable in virtually any application in which text data is indexed for later searching, retrieval, updating, and deletion. The embodiments of the present system and method are well suited for implementation in a distributed environment in which streams 1 of text data are persisted across multiple data storage nodes connected in a network 3.

Existing indexing solutions for text data fail to work with unbounded streams of incoming data. Prior approaches rely on periodically rebuilding index structures after the data set reaches a certain threshold. This may work well for batch-processed index updates, such as those used by web search engines. However, when applied to streaming data, such techniques result in long periods of time where the index is not available or where the index state reflects stale data.

Text indexing approaches have generally fallen into two categories: inverted indices and suffix arrays. Inverted indices are generally more space efficient, but require preprocessing text into individual word tokens and restricting queries to matches on whole word tokens. Suffix arrays, and their variants, allow for searching arbitrary substrings on large bodies of text, but require more up-front computation to generate the index data structures and generally have a much higher space penalty as compared to inverted indices.

As practical approaches for efficient incremental updates to suffix array-based text indices are lacking, recent applications which utilize such indices may leverage advanced compression techniques such as those used by the FM-index (developed by Ferragina and Manzini) and the Wavelet tree (developed by Navarro et al.). While these variants greatly reduce the space overhead required for suffix arrays, they fail to support efficient incremental updates at the rates required to handle incoming streams of data. In contrast, an embodiment of the present invention may provide efficient incremental updates that work in a distributed streaming environment.

Prior solutions for inverted indices include performing incremental merges of separate index segments using techniques such as a log-structured merge or a multi-way merge, which is the approach that is taken by the Apache Lucene Core project referenced above. More recent solutions include processes based on "cache-oblivious" data structures developed by researchers at Massachusetts Institute of Technology (MIT). While such methods have good amortized complexity for insertions, those approaches are inefficient as they require expensive periodic reorganizations of data within the index.

An object of an embodiment of the present invention may include a data structure designed for efficient batch insertions with the traditional inverted indices working on top of a compression layer. A benefit of such an embodiment is that it may work with block-based stream storage mechanisms and techniques, such as those disclosed in U.S. patent application Ser. No. 13/600,853, entitled "System and Method for Storing Data Streams in a Distributed Environment," which has been incorporated by reference above.

Figure 1:
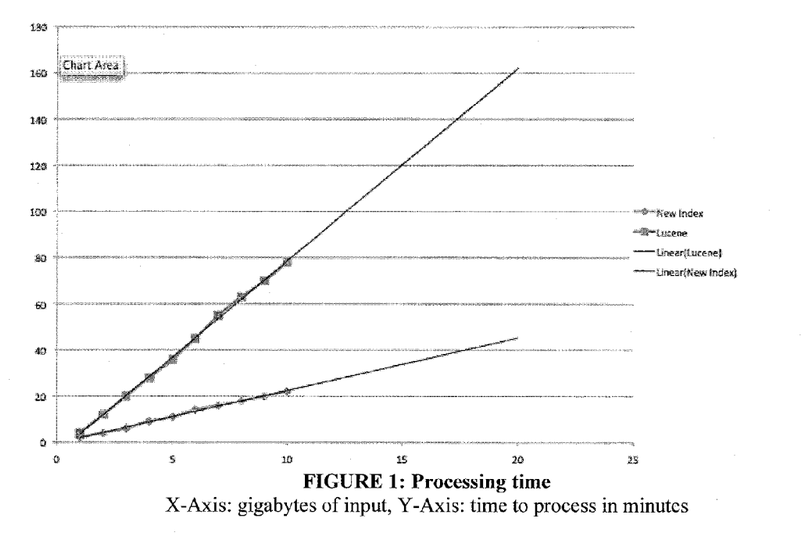
FIG. 1 is a graph illustrating the results of a scale test performed with a text-indexing system, in accordance with certain embodiments of the invention.
Figure 2:
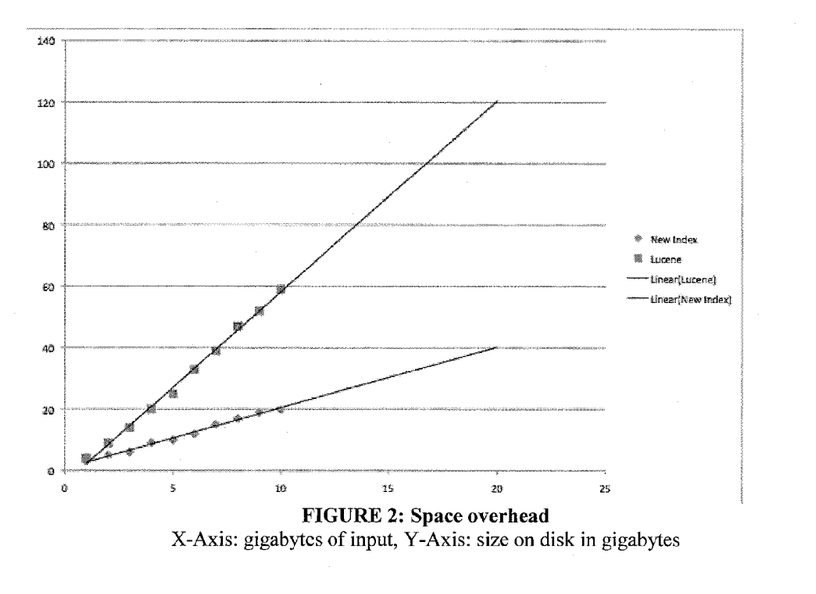
FIG. 2 is a graph illustrating the results of a scale test performed with a text-indexing system, in accordance with certain embodiments of the invention.

An advantage of an indexing embodiment for the presently disclosed invention which does not require utilization of traditional storage mechanisms may be appreciated when comparing the results illustrated in FIGS. 1 and 2. The results obtained from an indexing implementation of an embodiment of the presently disclosed invention are labeled "New Index," while the results obtained from the Apache Lucene implementation are labeled "Lucene." The Apache Lucene implementation is a full-text index implementation that uses traditional techniques known in the art. FIG. 1 compares the processing time results obtained by the Lucene implementation versus the New Index implementation. FIG. 2 compares the space overhead results obtained by the Lucene implementation versus the New Index implementation. As illustrated in these figures, the New Index implementation results in significantly shorter processing time and lower space overhead than the Lucene implementation as the amount of indexed data increases.

While FIGS. 1 and 2 do not illustrate background input/output (I/O) operations performed by the Apache Lucene implementation, the disadvantages in performance due to such additional operations can still be realized. The amount of background I/O operations that the Apache Lucene implementation uses for merge operations grows as the amount of indexed data grows. Once the index size is large enough, these periodic rebuild operations dominate system resources. In contrast, the novel indexing implementation of an embodiment of the presently disclosed invention requires no background I/O operations, and thus performance does not degrade as significantly as the amount of indexed data increases.

An embodiment of the invention may be performed in two phases: 1) front-end processing and 2) back-end storage. The front-end processing phase may utilize unstructured data-elements 2 as input. If such data 2 is not in text form, the data 2 may be first converted to a text representation using any appropriate method known in the art. Once the data 2 is in text form, the text data-elements 2 may be split into individual terms 9, such as words. The text data-elements 2 may be split using the process outlined in Unicode Standard Annex #29 such that language-specific word boundaries are respected. The annex, entitled "Unicode Text Segmentation" and published on the Internet by the Unicode Consortium, describes guidelines for determining default boundaries between certain significant text elements. After the input text data-elements 2 have been split into individual terms 9, the front-end processor calculates the frequency 10 of each term 9 in each event 8.

If using a block-based storage mechanism such as the one described in U.S. patent application Ser. No. 13/600,853, the term frequencies 10 may be reduced down to a set of frequency statistics 11 for the records or data-elements 2 contained in a single data-block 6. Once the data-block 6 is full and is flushed to disk, the block-level term frequency data 11 may be flushed to the tree index structure 12 described below. Parallelism in the front-end may be achieved as in the aforementioned patent application. A pool of data-blocks 6 may be made available during the insertion process, and threads performing insertions may update the term frequency data structures 10 for each pooled block after each insertion. Other storage mechanisms may introduce parallelism in the front-end phase as appropriate based on the underlying storage for each event 8. Such an embodiment which utilizes such a block-based storage mechanism is further described below.

Once frequency statistics/data 11 have been aggregated for each group of inserted records/data-elements 2, pointers 16 to each data-block 6, or to each individual record/data-element 2, may be inserted into the back-end storage tree structure 12. This tree structure 12 preferably uses a modified $B^+$-tree variant known as a Y-tree 12. The tree structure 12 may use other indexes that support fast bulk insertions while still providing efficient query performance, as accomplished by a B+-tree variant. The Y-tree paper, entitled "A Novel Index Supporting High Volume Data Warehouse Insertions," which has been incorporated by reference above, provides sufficient information for a competent developer familiar with $B^+$-trees to implement a fully functional Y-tree 12.

Records/data-elements 2 may be represented within such a Y-tree structure 12 by using individual terms 9 as keys 13 and lists 14 of record entries as values 15. Each value entry 15 may contain a pointer 16 to a data-block 6 along with overall statistics 11 for the records/data-elements 2 contained within that data-block 6. Parallelism in the back-end may be achieved by allowing multiple writers to each have an independent tree structure 12. In an embodiment, searches must be performed over all tree instances. Read-write locks or atomic lock-free schemes that work over tree structures 12 may also be used to allow parallel updates to a master tree structure 12.

As with traditional $B^+$-trees, explicitly caching frequently used data pages within the Y-tree 12 is an effective way to reduce the number of I/O operations performed when records are inserted into the index structure 12.

To perform searches against the index structure 12, the search query is processed in a manner similar to insertions.

The front-end is used to extract term statistics 10 from the query text. For each referenced term, the Y-tree structure 12 is used to generate a list of candidate data-blocks 6 that satisfy the search query, and the search query is evaluated against each data-block 6 to generate a list of matching records. Efficient ranked retrieval may be provided by using the aggregated block-level term statistics 11 contained in the master tree structure 12. Ranking functions based on cosine similarity may be used with a straightforward application of the procedure described in "Filtered Document Retrieval with Frequency-Sorted Indexes" authored by M. Persin et al. and published in the October, 1996 edition of the *Journal of the American Society for Information Science*.

Extended query operations such as term proximity searches may also be performed using such an embodiment, as described above. Wildcard suffix matches may be performed by finding the minimum key 13 in the Y-tree structure 12 that satisfies the pattern requirement and iterating through the keys 13 until reaching a key 13 that does not satisfy the pattern. Some types of searches—such as fuzzy matches or searches using the Soundex algorithm—may require a global term list. Soundex is a phonetic algorithm for indexing words by sound, as pronounced in English. This may be accomplished by iterating over the keys 13 in the Y-tree or, more efficiently, by maintaining a separate smaller list containing only terms 9 that are present in the Y-tree master index 12.

As with the aforementioned block-based storage system, individual pages within the Y-tree 12 may also be compressed using general-purpose, compression algorithms or by storing block or record lists in the Y-tree 12 via $\gamma$ or $\delta$ gap-compressed encodings.

If searches are to be performed by clients with minimal resources, these clients may multicast their queries to a set of dedicated nodes that perform searches on behalf of those clients. If using separate Y-tree indices 12 per stream writer, results gathered from each search node may be combined with a straightforward application of techniques used in parallel map-reduce systems. These search nodes may also benefit from the addition of an index data page cache to ensure queries containing popular terms 9 are quickly serviced. Additionally, the amount of time that pages are allowed to reside in the cache before being refreshed with newer pages from backing storage may be tuned or adjusted to balance freshness of results versus the amount of I/O operations performed in order to keep those results up-to-date.

An object of an embodiment of the present invention may be to balance fast insertion speeds with ensuring that data is available as soon as possible, all while efficiently mapping to file system operations available in distributed file systems. Selection of an indexing structure 12 that accomplishes these objectives was an important part of the design process used to generate the techniques embodied by the presently disclosed invention. In addition to selecting such a data structure 12, an embodiment may require augmenting inverted indices with data structures that support efficient batch insertions. These techniques, together with the extended Y-tree index structure 12 disclosed in this present application, solve the technical problems associated with satisfying the requirements presented by the above objectives.

A specific object for an embodiment may be to achieve a sustained insertion rate of over 50,000 events 8 per second for an input data set containing 5 billion events 8. Due to the paged nature of certain approaches, searches against the generated index 12 may require only one block of index data in memory at a time. Conventional search structures often require holding significant portions of the index structure 12 in memory in order to perform searches against the indexed data. Due to the compression mechanism used by the index structure 12, the storage space used by the index 12 and the data stored by the index 12 may be approximately one-quarter of the size of the raw data set in its uncompressed form.

The term "data element" 2 shall mean a set of binary data containing a unit of information. Examples of data-elements 2 include, without limitation, a packet of data flowing across a network 3; a row returned from a database query; a line in a digital file such as a text file, document file, or log file; an email message; a message system message; a text message; a binary large object; a digitally stored file; an object capable of storage in an object-oriented database; and an image file, music file, or video file. Data-elements 2 often, but do not always, represent physical objects such as sections of a DNA molecule, a physical document, or any other binary representation of a real world object.

The term "instructions" shall mean a set of digital data containing steps to be performed by a computing device. Examples of "instructions" include, without limitation, a computer program, macro, or remote procedure call that is executed when an event occurs (such as detection of an input data-element 2 that has a high probability of falling within a particular category). For the purposes of this disclosure, "instructions" can include an indication that no operation is to take place, which can be useful when an event that is expected, and has a high likelihood of being harmless, has been detected, as it indicates that such event can be ignored. In certain preferred embodiments, "instructions" may implement state machines.

The term "machine readable storage" shall mean a medium containing random access or read-only memory that is adapted to be read from and/or written to by a computing device having a processor. Examples of machine readable storage shall include, without limitation, random access memory in a computer; random access memory or read only memory in a network device such as a router switch, gateway, network storage device, network security device, or other network device; a CD or DVD formatted to be readable by a hardware device; a thumb drive or memory card formatted to be readable by a hardware device; a computer hard drive; a tape adapted to be readable by a computer tape drive; or other media adapted to store data that can be read by a computer having appropriate hardware and software.

The term "network" 3 or "computer network" shall mean an electronic communications network adapted to enable one or more computing devices to communicate by wired or wireless signals. Examples of networks 3 include, but are not limited to, local area networks (LANs), wide area networks (WANs) such as the Internet, wired TCP and similar networks, wireless networks (including without limitation wireless networks conforming to IEEE 802.11 and the Bluetooth standards), and any other combination of hardware, software, and communications capabilities adapted to allow digital communication between computing devices.

The term "operably connected" shall mean connected either directly or indirectly by one or more cable, wired network, or wireless network connections in such a way that the operably connected components are able to communicate digital data from one to another.

The term "output" shall mean to render (or cause to be rendered) to a human-readable display such as a computer or handheld device screen, to write to (or cause to be written to) a digital file or database, to print (or cause to be printed), or to otherwise generate (or cause to be generated) a copy of information in a non-transient form. The term "output" shall include creation and storage of digital, visual and sound-based representations of information.

The term "server" shall mean a computing device adapted to be operably connected to a network 3 such that it can receive and/or send data to other devices operably connected to the same network, or service requests from such devices. A server has at least one processor and at least one machine-readable storage medium operably connected to that processor, such that the processor can read data from that machine-readable storage.

The term "system" shall mean a plurality of components adapted and arranged as indicated. The meanings and definitions of other terms used herein shall be apparent to those of ordinary skill in the art based upon the following disclosure.

Figure 3:
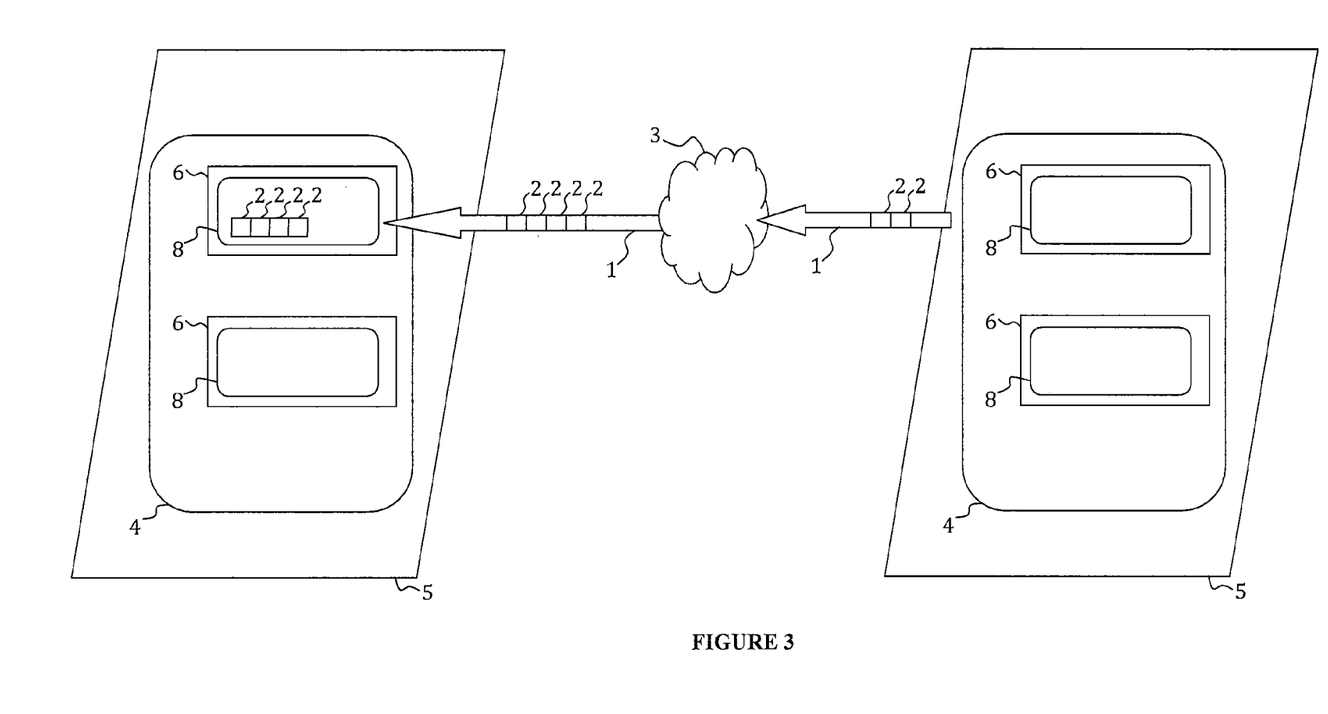
FIG. 3 is a block diagram illustrating components of an embodiment of a data indexing system, in accordance with certain embodiments of the invention.

FIG. 3 is a block diagram illustrating components of an embodiment of a data indexing system, in accordance with certain embodiments of the invention. As shown, such an embodiment may comprise block-stores 4 stored on distributed devices 5. The distributed devices 5 may be adapted to communicate via a network 3. A distributed device 5 may comprise a computing device, such as a computer or a smart phone, which can share data with other distributed devices 5 via a network 3. Data-streams 1 may be transmitted and received from the distributed devices 5. Each of the data-streams 1 may comprise data-elements 2, which may be transmitted via the network 3. The block-stores 4 may store the data-elements 2 of the received data-streams 1. Such stored data-elements 2 may comprise digital copies of the transmitted data-elements 2. The data-elements 2 may comprise unstructured data.

The stored data-elements 2 may be allocated to data-blocks 6 of a block-store 1, as illustrated in FIG. 3. Such block-allocated data-elements 2 may be logically grouped. Each of the block-stores 4 may comprise one or more data-blocks 6. In an embodiment, each data-block 6 may comprise the stored data-elements 2 of only one of the received data-streams 1. In addition, the data-blocks 6 of a single data-stream 1 may be logically grouped. In an embodiment, a block-identifier 7 may be assigned to each of the data-blocks 6. Such a block-identifier 7 may be globally unique. The data-blocks 6 may comprise events 8. The block-allocated data-elements 2 may be further allocated to the events 8 of the data-blocks 6. Such event-allocated data-elements 2 may be logically grouped. Each of the data-blocks 6 may comprise one or more events 8. Each of the events 8 may comprise the block-allocated data-elements 2 of the corresponding data-block 6. In an embodiment, these event-allocated data-elements 2 may comprise the stored data-elements 2 of only one of the received data-streams 1.

Figure 4:
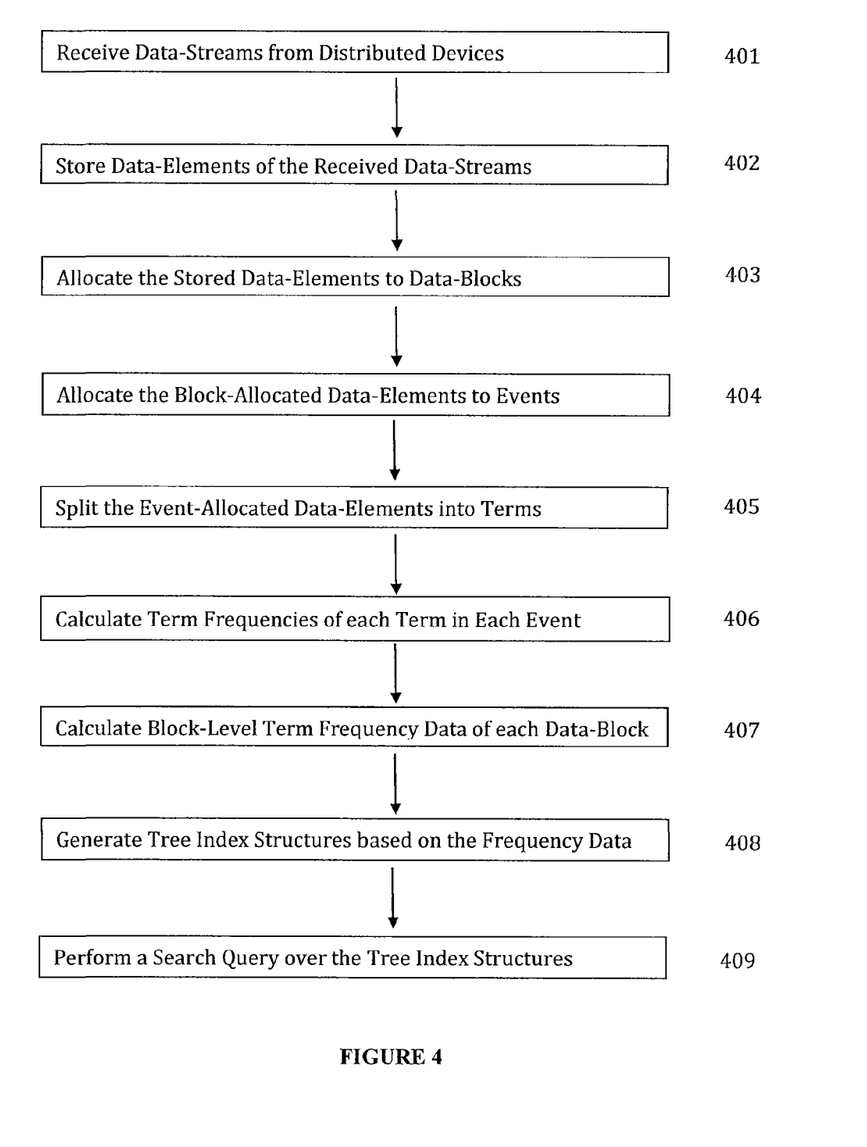
FIG. 4 is a flowchart illustrating steps of an embodiment of a data indexing method, in accordance with certain embodiments of the invention.

FIG. 4 is a flowchart illustrating steps of an embodiment of a data indexing method, in accordance with certain embodiments of the invention. As shown, such an embodiment may comprise the step of receiving 401 data-streams 1. The data-streams 1 may be received from a single distributed device 5 or from a plurality of distributed devices 5. The distributed devices 5 may be connected via a network 3. Each of the data-streams 1 may comprise data-elements 2. The method may include the step of storing 402 the data-elements 2 of the received data-streams 1. The stored data-elements 2 may be stored in block-stores 4. The block-stores 4 may be stored on a single distributed device 5 or across a plurality of distributed devices 5. Such distributed devices 5 may be connected via a network 3.

Further, the method may include the step of allocating 403 the stored data-elements 2 to data-blocks 6 of the block-stores 4. Each of the block-stores 4 may comprise one or more data-blocks 6. In an embodiment, each data-block 6 may comprise the stored data-elements 2 of only one of the received data-streams 1. The data-blocks 6 of a single data-stream 1 may be logically grouped together. Each of the data-blocks 6 may be read and written as a single unit. In addition, the method may include allocating 404 the block-allocated data-elements 2 to events 8 of the data-blocks 6. Each of the data-blocks 6 may comprise one or more events 8. Each of the events 8 may comprise the block-allocated data-elements 2 of the corresponding data-block 6.

In addition, the method may include the step of splitting 405 the event-allocated data-elements 2 into terms 9. Further, the method may include the step of calculating 406 a frequency 10 of each term 9 within each of the event 8, and the step of calculating 407 block-level term frequency statics or data 11 for the event-allocated data-elements 2 that are stored in the corresponding data-block 6 based on the calculated term frequencies 10. The method may also include the step of generating 408 tree index structures 12 for the event-allocated data-elements 2 based on the block-level term frequency data 11. The tree index structures 12 may comprise Y-tree index structures. The Y-tree index structures 12 may use the terms 9 as keys 13. The method may further include the step of performing 409 a search query for the data-elements 2 over all of the tree index structures 12.

While the invention has been particularly shown and described with reference to an embodiment thereof, it will be understood by those skilled in the art that various changes in form and details may be made therein without departing from the spirit and scope of the invention.

What is claimed is:

1. A method for indexing data, comprising the steps of:
receiving data-streams, wherein the data-streams comprise data-elements;
storing the data-elements of the received data-streams, wherein the stored data-elements are stored via one or more processors in block-stores;
allocating the stored data-elements to data-blocks of the block-stores, wherein the stored data-elements are allocated via the one or more processors to the data-blocks;
further allocating the block-allocated data-elements to events of the data-blocks, wherein each of the data-blocks comprise one or more events, wherein each of the events comprise the block-allocated data-elements of the corresponding data-block, wherein the block-allocated data-elements are allocated via the one or more processors to the events;
splitting the event-allocated data-elements into terms, wherein the event-allocated data-elements are split via the one or more processors into the terms;
calculating a term frequencies of each term in each of the events, wherein the term frequencies are calculated via the one or more processors;
calculating block-level term frequency data for the event-allocated data-elements stored in the corresponding data-block based on the term frequencies, wherein the block-level term frequency data is calculated via the one or more processors; and,
generating tree index structures for the event-allocated data-elements based on the block-level term frequency data, wherein the tree index structures comprise Y-tree index structures, wherein the terms are used in the Y-tree index structures as keys, wherein the tree index structures are calculated via the one or more processors.

2. The method of claim 1, further comprising the step of:
generating pointers to the data-blocks, wherein the pointers comprise values stored in the Y-tree index structures that identify the corresponding data-blocks and the corresponding block-level term frequency data.

3. The method of claim 1, wherein the event-allocated data-elements comprise text data.

4. The method of claim 1, wherein the event-allocated data-elements comprise a text representation of non-text data, wherein at least one of the data-streams comprises non-text data that is converted into the text representation.

5. The method of claim 1, wherein multiple writers to the data-blocks have an independent tree structure.

6. The method of claim 1, further comprising the step of: performing a search query of the tree index structures.

7. The method of claim 6, wherein the search query for the data-elements is performed over all of the tree index structures.

8. The method of claim 7, further comprising the step of: extracting term statistics from query text of the search query.

9. The method of claim 8, further comprising the step of: generating a list of candidate data-blocks that satisfy the search query based on the Y-tree index structure.

10. The method of claim 9, further comprising the step of: evaluating the search query against each of the data-blocks to generate a list of matching records.

11. The method of claim 1, further comprising the step of: performing a term-proximity search query of the tree index structures.

12. The method of claim 11, wherein the term-proximity search query is a wildcard suffix matches search query, wherein a minimum key in the Y-tree index structures satisfies a pattern requirement, and wherein the keys are iterated until reaching a key that is different from the pattern requirement.

13. The method of claim 11, wherein the term-proximity search query is a fuzzy matches search query.

14. The method of claim 11, wherein the term-proximity search query is based on a Soundex algorithm.

15. The method of claim 11, further comprising the step of: maintaining a list of the terms that are present in a master Y-tree index structure.

16. The method of claim 1, further comprising the step of: compressing individual pages within the Y-tree index structure.

17. The method of claim 16, wherein the individual pages within the Y-tree index are compressed by compression algorithms.

18. The method of claim 16, wherein the individual pages within the Y-tree index are compressed by storing data-block in the Y-tree index structures via gap-compressed encodings.

19. The method of claim 1, further comprising the step of: multicasting search queries to a set of dedicated search nodes that perform searches.

20. The method of claim 19, further comprising the step of: combining query results that are gathered from the search nodes, wherein separate Y-tree index structures are utilized per stream writers.

21. The method of claim 19, further comprising the step of: generating an index data page cache for the search nodes.

22. The method of claim 19, further comprising the step of: adjusting a pre-determined amount of time that an index data page resides in cache before being refreshed with a new page.

23. The method of claim 1, wherein the data-streams are received from a plurality of distributed devices, wherein the plurality of distributed devices are connected via a network.

24. The method of claim 1, wherein the block-stores are stored on a plurality of distributed devices, wherein the plurality of distributed devices are connected via a network.

25. The method of claim 1, further comprising the step of: assigning a block-identifier to data-blocks of the block-stores, wherein the block-identifier is globally unique, wherein each of the data-blocks are read and written as a single unit, and wherein the data-blocks of a single data-stream are logically grouped.

26. A system for indexing data, comprising:
block-stores adapted to store data-elements of data-streams;
data-blocks of the block-stores, the stored data-elements being allocated via one or more processors to the data-blocks;
events of the data-blocks, the block-allocated data-elements being further allocated via the one or more processors to the events of the data-blocks, each of the data-blocks comprising one or more events, each of the events comprising the block-allocated data-elements of a corresponding data-block;
terms generated via the one or more processors by splitting the event-allocated data-elements;
term frequencies calculated via the one or more processors based on the frequency of each term in each of the events;
block-level term frequency data calculated via the one or more processors for the event-allocated data-elements that are stored in a corresponding data-block, the block-level term frequency data being based on the term frequencies; and,
tree index structures generated via the one or more processors for the event-allocated data-elements based on the block-level term frequency data, the tree index structures comprising Y-tree index structures, the terms being used in the Y-tree index structures as keys.

27. The system of claim 26, wherein the block-stores are stored on a plurality of distributed devices, wherein the plurality of distributed devices are connected via a network.

28. The system of claim 26, wherein the data-streams are received from a plurality of distributed devices, wherein the plurality of distributed devices are connected via a network.

29. A non-transitory computer readable medium having computer readable instructions stored thereon for execution by a processor, wherein the instructions on the non-transitory computer readable medium are adapted to enable a computing device to:
receive data-streams, wherein the data-streams comprise data-elements;
store the data-elements of the received data-streams, wherein the stored data-elements are stored in block-stores;
allocate the stored data-elements to data-blocks of the block-stores;
further allocate the block-allocated data-elements to events of the data-blocks, wherein each of the data-blocks comprise one or more events, wherein each of the events comprise the block-allocated data-elements of the corresponding data-block;
split the event-allocated data-elements into terms;
calculate term frequencies of each term in each of the events;
calculate block-level term frequency data for the event-allocated data-elements stored in the corresponding data-block based on the term frequencies; and,
generate tree index structures for the event-allocated data-elements based on the block-level term frequency data, wherein the tree index structures comprise Y-tree index structures, wherein the terms are used in the Y-tree index structures as keys.

* * * * *